United States Patent
Yamamoto et al.

(10) Patent No.: US 11,853,580 B1
(45) Date of Patent: Dec. 26, 2023

(54) DATA MIGRATION MANAGEMENT BASED ON DATA LOCATION

(71) Applicant: International Business Machines Corporation, Armonk, NY (US)

(72) Inventors: Noriko Yamamoto, Tokyo (JP); Atsushi Abe, Ebina (JP); Tsuyoshi Miyamura, Yokohama (JP); Tohru Hasegawa, Tokyo (JP); Hiroshi Itagaki, Yokohama (JP); Shinsuke Mitsuma, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/809,909

(22) Filed: Jun. 30, 2022

(51) Int. Cl.
*G06F 3/06* (2006.01)
*G11B 5/008* (2006.01)

(52) U.S. Cl.
CPC .......... *G06F 3/0647* (2013.01); *G06F 3/0607* (2013.01); *G06F 3/0686* (2013.01); *G11B 5/00813* (2013.01)

(58) Field of Classification Search
CPC .... G06F 3/0647; G06F 3/0607; G06F 3/0686; G11B 5/00813; G11B 5/00817; G11B 5/78; G11B 15/18; G11B 15/00; G11B 15/1808; G11B 15/1816; G11B 15/1825; G11B 2220/93; G11B 2220/90
See application file for complete search history.

(56) References Cited

U.S. PATENT DOCUMENTS 6,674,599 B1 * 1/2004 Rae .......................... G11B 27/11
7,633,700 B2 * 12/2009 Gill .................... G11B 5/00813

(Continued)

FOREIGN PATENT DOCUMENTS

JP   2011134413 A   7/2011
WO  2012176539 A1  12/2012

OTHER PUBLICATIONS

"Average block locate time from load point for 3592 tape drives", IBM, TS4500 tape library, downloaded from the Internet on Nov. 12, 2021, 3 pages, <https://www.ibm.com/docs/en/ts4500-tape-library?topic=dp-3592-average-block-locate-time-from-load-point>.
"IBM TotalStorage LTO Ultrium Tape Drive SCSI Reference", IBM, Aug. 18, 2021, GA32-0928-04, 538 pages.
"Performance specifications for 3592 tape drives", IBM, TS4500 tape library, downloaded from the Internet on Nov. 12, 2021, 3 pages, <https://www.ibm.com/docs/en/ts4500-tape-library?topic=performance-3592-specifications>.

(Continued)

*Primary Examiner* — Khoa D Doan
(74) *Attorney, Agent, or Firm* — Stephen R. Yoder; Aaron Pontikos

(57) ABSTRACT

A computer implemented method includes obtaining positional information corresponding to end of data (EOD) on a tape and a data extent stored in the tape, wherein the positional information includes longitudinal position (LPOS), latitudinal position (wrap), and number of data blocks, comparing a block number of at least one of a currently read or located data with the positional information of the data extent to identify a current position of a tape head, identifying a positional relationship between a location of data to be read, the positional information of the EOD on the tape, and the current position of the tape head, identifying a directional relationship between a current direction of the tape head locating to data to be read and a pending write direction, and determining an appendable range for data after the EOD on the tape based on the identified positional relationship and the identified directional relationship.

20 Claims, 9 Drawing Sheets

(56) References Cited

U.S. PATENT DOCUMENTS

| | | | |
|---|---|---|---|
| 8,966,169 B2* | 2/2015 | Shiratori | G11B 5/00817 |
| | | | 711/143 |
| 9,025,261 B1* | 5/2015 | Hasegawa | G11B 20/00007 |
| | | | 360/73.02 |
| 9,601,141 B2 | 3/2017 | Shiratori | |
| 10,649,697 B2 | 5/2020 | Hasegawa | |
| 2011/0157741 A1 | 6/2011 | Shiratori | |
| 2012/0284456 A1 | 11/2012 | Masuda | |
| 2014/0226236 A1 | 8/2014 | Shiratori | |
| 2016/0329079 A1 | 11/2016 | Abe | |
| 2017/0153820 A1 | 6/2017 | Hasegawa | |
| 2019/0339879 A1 | 11/2019 | Abe | |
| 2019/0361606 A1* | 11/2019 | Goker | H03M 13/373 |
| 2020/0326872 A1 | 10/2020 | Miyoshi | |
| 2021/0118470 A1 | 4/2021 | Miyamura | |

OTHER PUBLICATIONS

Authors et. al.: Disclosed Anonymously, "Automatic Data Migration and Recall Method while Optimizing Storage Cost", An IP.com Prior Art Database Technical Disclosure, IP.com No. IPCOM000261432D, IP.com Electronic Publication Date: Mar. 2, 2020, 7 pages.

* cited by examiner

1

DATA MIGRATION MANAGEMENT BASED ON DATA LOCATION

BACKGROUND

The present invention relates generally to the field of tape drive implementations, and more specifically to migrating data to a tape.

Many storage systems write data to a primary storage composed of hard disk drive(s) (HDD) initially (in a resident state), and the data are subsequently written to a secondary storage composed of magnetic tape storages (in a migrated state). If data exists in both the primary storage and the secondary storage, it is in a pre-migration state. After a certain period of time has passed, data on the primary storage is deleted, and the data exists on the tape (secondary storage) only. Migration as used herein refers to the act of moving a data item from the primary storage device to the secondary storage device; recall as used herein refers to the act of reading data from a tape in the migration state. When a host requests to read migrated data, the tape drive mounts a magnetic tape, copies data from the tape to the primary storage, and the data is transferred to the host from the primary storage. If many recall or migration requests occur at the same time, the requests are accumulated in a recall queue or a migration queue on the host. If there are no requests in a recall queue and a recall is not requested in a defined period of time, and if there is space on a tape mounted for recall, a mounted tape can be used for migration. If there are recall requests in recall queue, requests in the migration queue may wait to be processed due to the migration requests low priority.

SUMMARY

As disclosed herein, a computer implemented method includes obtaining positional information corresponding to end of data (EOD) on a tape and a data extent stored in the tape, wherein the positional information includes longitudinal position (LPOS), latitudinal position (wrap), and number of data blocks, comparing a block number of at least one of a currently read or located data with the positional information of the data extent to identify a current position of a tape head, identifying a positional relationship between a location of data to be read, the positional information of the EOD on the tape, and the current position of the tape head, identifying a directional relationship between a current direction of the tape head locating to data to be read and a pending write direction, and determining an appendable range for data after the EOD on the tape based on the identified positional relationship and the identified directional relationship. A computer program product and computer system corresponding to the method are also disclosed.

DETAILED DESCRIPTION

When a tape is loaded onto a drive, a linear tape file system (LTFS) reads an LTFS index from the tape to a disk such as a hard disk drive (HDD) or a solid state drive (SSD). Based on data extent information recorded in the LTFS index, positional information of the beginning and end of each data extent on the tape can be obtained along with a size of each block, a first block number, and a number of bytes pertaining to the data extent. Embodiments of the present invention comprise a migration manager configured to obtain data extent information from the LTFS. Methods as disclosed herein may enable improved efficiency across recall and migration processes given the ability to simultaneously process migrations and recalls. Embodiments of the present invention do not temporarily store migration data on a device in a tape drive such as a nonvolatile memory, thus requiring no additional devices and imposing no restrictions on the frequency of writing to a nonvolatile memory and the size of the data.

Figure 1:
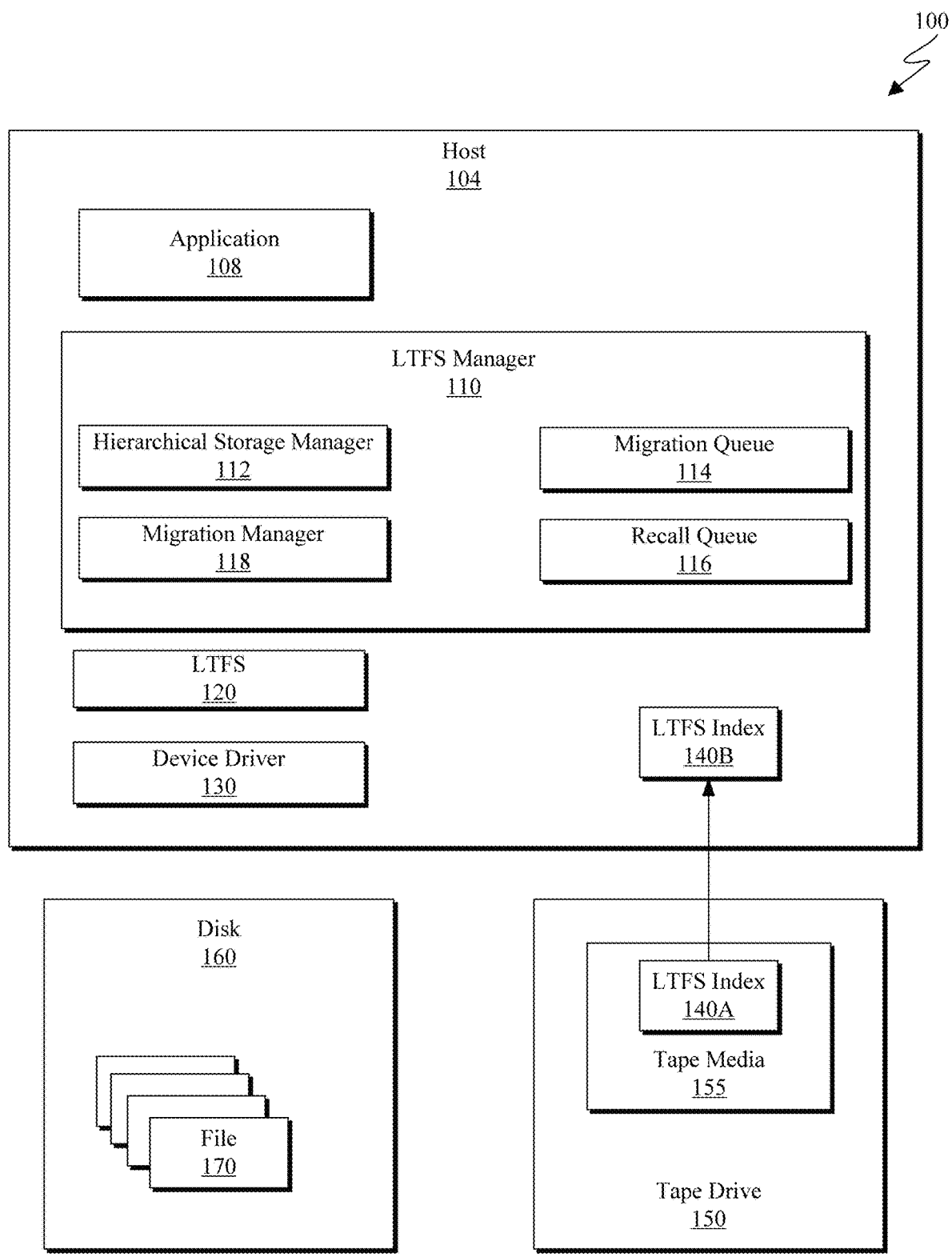
FIG. 1 is a block diagram which depicts components of a storage system in accordance with an embodiment of the present invention.

FIG. 1 is a functional block diagram depicting a storage system 100 in accordance with an embodiment of the present invention. As depicted, storage system 100 includes host 104, tape drive 150, and disk 160. With respect to the depicted embodiment, host 104 includes application 108, LTFS manager 110, LTFS 120, device driver 130 and LTFS index 140B. LTFS manager 110 includes hierarchical storage manager 112, migration queue 114, recall queue 116, and migration manager 118. With respect to the depicted embodiment, tape drive 150 includes tape media 155; tape media 155 includes an LTFS index 140A; disk 160 includes a set of files 170.

Application 108 may be configured to receive LTFS requests from systems other than host 104.

In general, application 108 is configured to request operations to LTFS manager 110 with respect to a linear tape file system, such as LTFS 120, and the subsequent devices or entities, such as tape drive 150, disk 160, device driver 130, etc.

LTFS manager 110 may be configured to manage functions relative to a subject linear tape file system, such as LTFS 120. LTFS 120 is configured to read an LTFS index 140A when tape media 155 is loaded onto tape drive 150. In at least some embodiments, LTFS 120 is configured to read said LTFS index 140A from Tape Media 155 onto host 104, creating LTFS index 140B. In at least some embodiments, LTFS manager 110 may be hosted by application 108; in other embodiments, LTFS manager 110 is hosted concurrently with LTFS 120 and is configured to communicate with application 108.

Hierarchical storage manager 112 may be configures to receive a request of reading or storing files from application 108 and add the request to migration queue 114 or recall queue 116. Hierarchical storage manager 112 may be configured to start recall or migration in the queue by a defined rule.

Device driver 130 may be configured to enable the hardware devices of storage system 100 to communicate with an operating system of host 104. Tape drive 150 may be a data storage device that reads and writes data on a magnetic tape. LTFS index 140A and 140B may be an index configured to provide positional details of a current tape (such as tape media 155) to a requesting entity. Tape media 155 may be the tape, such as magnetic tape, on which tape drive 150 records and reads data. Disk 160 may be a hard disk drive (HDD), a solid state drive (SSD), or a hybrid hard drive configured to store data. Disk 160 may refer to any number of technologies capable of providing secondary storage in a system utilizing tape storage as a primary storage mechanism, such as depicted storage system 100. The set of files 170 may correspond to files recently read from tape media 155, or queued to be written to tape media 155, etc.

Figure 4:
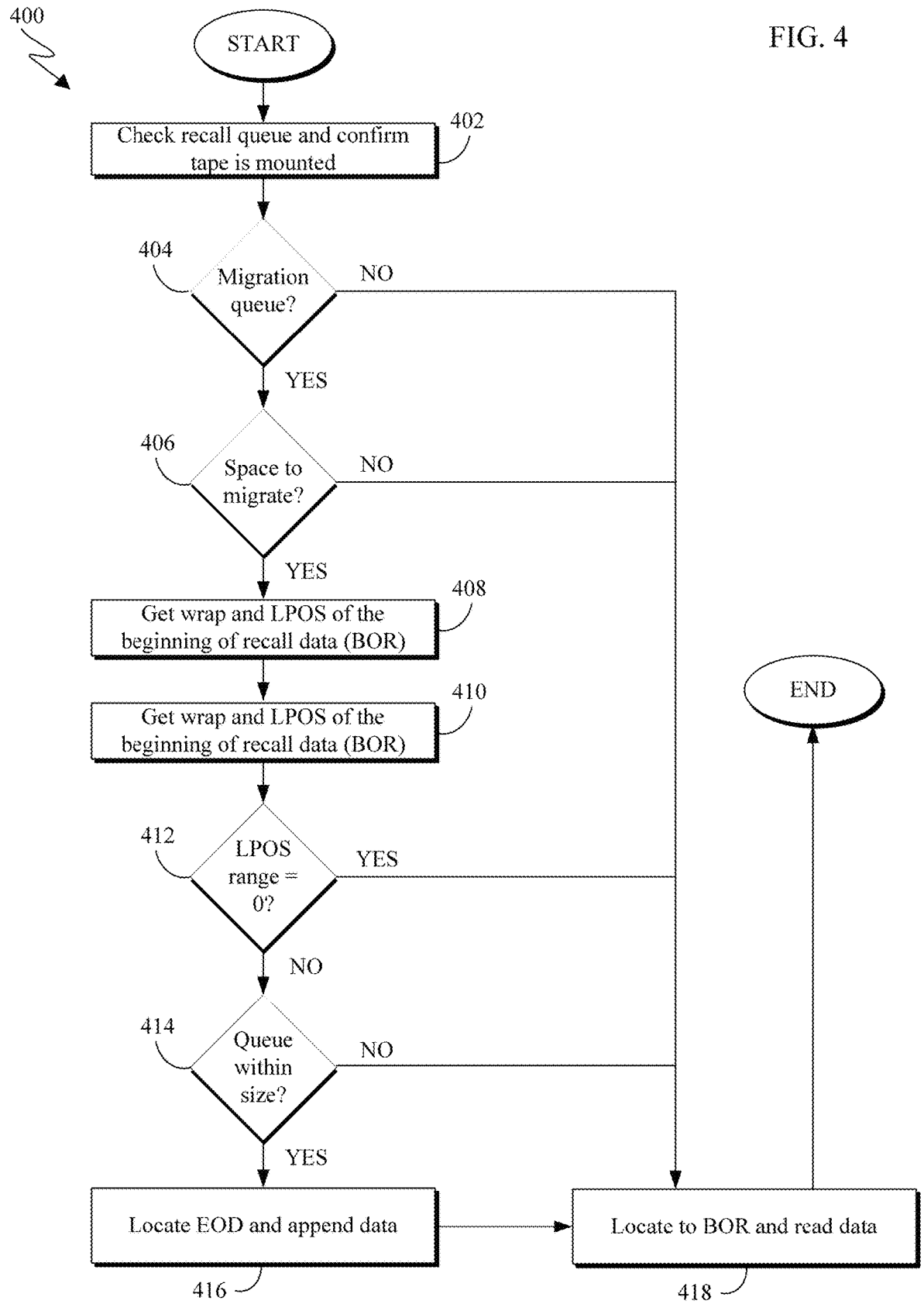
FIG. 4 is a flowchart which depicts one embodiment of a migration management method in accordance with an embodiment of the present invention.

Migration manager 118 may be configured to execute a migration management method, such as migration management method 400 described with respect to FIG. 4. Similarly, migration manger 118 may be configured to execute an appendable LPOS range determination method, such as appendable LPOS range determination method 600 described with respect to FIG. 6.

A block number of last data items in each wrap, which is recorded in a tape directory of cartridge memory, is read from a tape cartridge by a read buffer command. When a change of wrap is confirmed according to an obtained startwrap position and endwrap position of the data extent during appended data, a last block number of the previous wrap is obtained at a break of the write command.

When a tape is unloaded from a drive, validity of the end of data (EOD), a wrap containing the EOD, and a longitudinal position (LPOS) are also recorded in cartridge memory. When the tape is loaded, a position of the EOD is read by a host using a read buffer command from the drive and held by the migration manager. Upon completion of writing a data extent, a terminal wrap (endwrap) and LPOS (endlpos) are updated by the migration manager as positional information of EOD and held thereby until a tape is unloaded. When information is written to an LTFS index after a data write, a position of the EOD is obtained to update EOD information.

When "locate" is the most recent command, a drive typically locates the beginning of a data extent such that the start wrap (startwrap) and LPOS (startlpos) (obtained from an LTFS index) corresponds to a tape head position. When a located block number does not correspond to the beginning of the data extent, the current head position is calculated from the data extent information in the LTFS index, a startblock (k) of the data extent, a number of bytes included in the data extent (bytecount: N bytes), a size of each block (blocksize: B bytes), and positions of the beginning (startlpos Ls) and end (endlpos Le) of the data extent.

When "read" is the most recent command, an LTFS typically reads a block of data called a data extent, in which the end of the data extent is regarded as a position of a tape head when the read command is processed successfully.

After a period of time has elapsed, a tape head may be in a different position without being detected by a host, resulting from circumstances such as automatic unthreading by a drive. Therefore, when a selected period of time has passed since the most recent command, a Small Computer System Interface (SCSI) command is sent from a host to a drive to obtain positional information of a head from a mode page or sense data.

Figure 2:
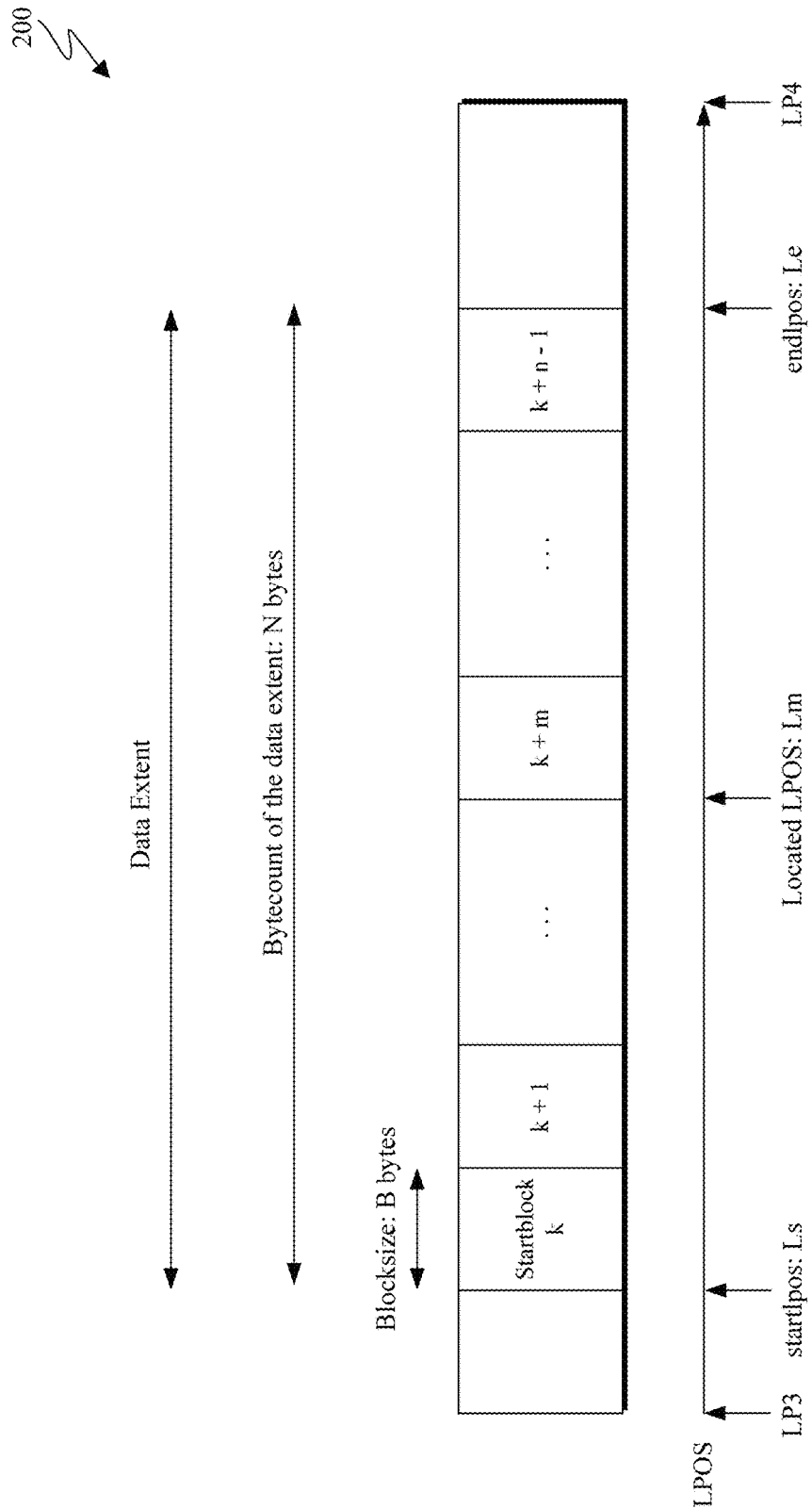
FIG. 2 depicts a data extent falling within a single wrap in accordance with an embodiment of the present invention.

FIG. 2 depicts a data extent falling within a single wrap 200 in accordance with an embodiment of the present invention. As depicted, FIG. 2 defines a data extent within the depicted wrap, denoted by wrap end LP3 and wrap end LP4, as well as the blocksize "B" of the data extent, the startblock "k", subsequent blocks "k+1", "k+m", "k+n−1", a number of blocks "n" of the data extent, a start LPOS "Ls" of the data extent, and an end LPOS "Le" of the data extent. The blocksize B has fixed size in the data extent. If the last block is not full-filled by data, the left space is padded and the data block with blocksize B is written. Assuming that a located block number is k+m as shown in FIG. 2, an approximate position Lm of a located tape head can be calculated according to equation (1):

$$Lm = (Le-Ls) \times (m/n) + Ls \qquad (1)$$

With respect to equation 1, the number of blocks n included in the data extent is assumed to correspond to an integer obtained by dividing N by B or an integer to which 1 is added if the integer is not dividable.

Figure 3:
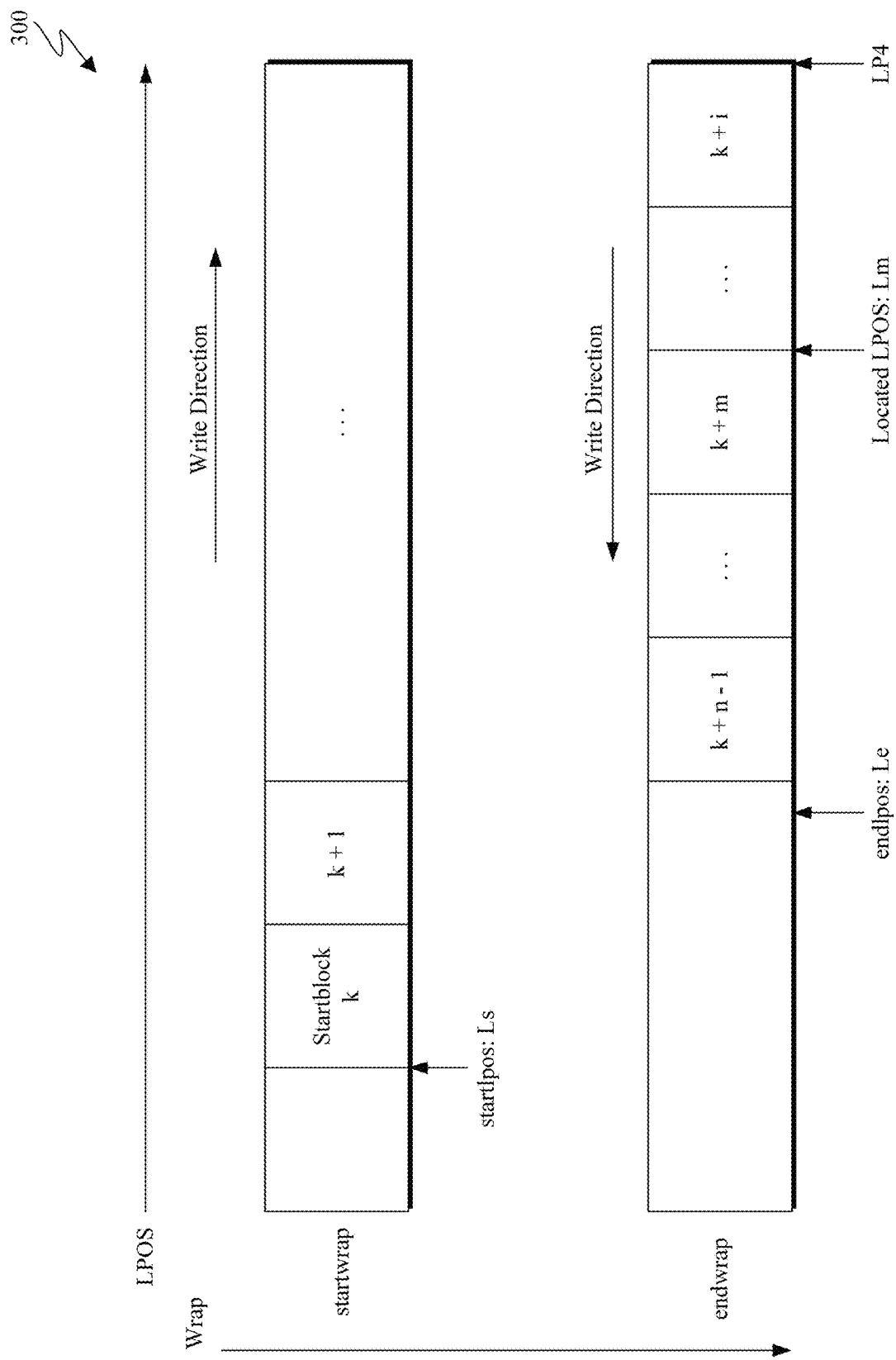
FIG. 3 depicts a data extent spanned across multiple wraps of a tape in accordance with an embodiment of the present invention.

FIG. 3 depicts a data extent spanned across multiple wraps of a tape 300 in accordance with an embodiment of the present invention. As depicted, FIG. 3 defines the blocksize "B" of the data extent, the startblock "k", subsequent blocks "k+1", "k+i", "k+m", "k+n−1", a number of blocks "n" of the data extent, a start LPOS "Ls" of the data extent, and an end LPOS "Le" of the data extent. When a data extent exists across several wraps, an approximate LPOS of a located tape head can be estimated by obtaining a wrap start block number ("k+i") recorded in each wrap and LPOS with tape ends LP3 and LP4 from a drive. An approximate LPOS of a located tape head Lm of block number (k+m) may be calculated according to equation (2):

$$Lm = LP4 - (LP4 - Le) \times (m-i)/(n-i) \qquad (2)$$

FIG. 4 depicts one embodiment of a migration management method 400 in accordance with an embodiment of the present invention. As depicted, migration management method 400 includes checking (402) recall queue and confirming a tape is mounted, determining (404) whether migration requests exist in a migration queue, determining (406) whether there is space to migrate, identifying (408) a wrap and LPOS of the beginning of recall data (BOR), identifying (410) an EOD and a current head position, determining (412) whether an appendable LPOS range is 0, determining (414) whether a migration queue is having data within the size of LPOS range, locating (416) to the EOD and appending the data, and locating (418) to the BOR and reading the data.

Checking (402) recall queue and confirming a tape is mounted may include detecting a state of recall requests accumulated in a recall queue. In at least some embodiments, checking (402) the recall queue includes verifying a tape is mounted on a tape drive. If the tape is not mounted, mount the tape and return to (402).

Determining (404) whether migration requests exist in a migration queue may include identifying a migration queue configured to hold one or more migration requests until they are able to be processed. In at least some embodiments, determining (404) whether migration requests exist includes determining whether any unresolved migration requests exist in the migration queue. If it is determined that one or more migration requests exist in a migration queue (404, yes branch), the method continues by determining (406) whether there is space to migrate. If it is determined that no migration requests exist in a migration queue (404, no branch), the method continues by locating (418) to the beginning of the recall data (BOR).

Determining (406) whether there is space to migrate may include analyzing a tape which stores the data to be recalled to determine how much free space exists on the tape. In at least some embodiments, determining (406) whether there is space to migrate includes comparing the free space on the tape to the space required to fulfill the requests in the migration queue. If it is determined that there is sufficient space to migrate (406, yes branch), the method continues by identifying (408) a wrap and an LPOS of the beginning of the recall data. If it is determined that there is insufficient space to migrate (406, no branch), the method continues by locating (418) to the beginning of the recall data.

Identifying (408) a wrap and longitudinal position (LPOS) of the beginning of the recall data (BOR) may include analyzing an LTFS index held in the host to discern identifying information corresponding to the recall data. Similarly, identifying (410) an EOD and a current head position may include querying the tape drive for identifying information regarding the current head position and EOD.

Determining (412) whether an appendable LPOS range is 0 may include calculating an estimated appendable LPOS range. In at least some embodiments, determining (412) whether the appendable LPOS range is 0 includes estimating the appendable LPOS range based, at least in part, on the current tape head position, the end of data (EOD), and the beginning of the recall data BOR. In at least some embodiments, the LPOS range is estimated according to an appendable LPOS range determination method, such as is described with respect to FIG. 6. If the appendable LPOS range is estimated to be 0 (412, yes branch), the method continues by locating (418) to the beginning of the recall data. If the appendable LPOS range is estimated to be greater than zero (412, no branch), the method continues by determining (414) whether a migration queue is within the size.

Determining (414) whether a migration request is within the size may include confirming the LPOS range. In at least some embodiments, determining (414) whether a migration request is within the size includes executing an appendable LPOS range determination method, such as is described with respect to FIG. 6. Determining (414) whether a migration request is within the size includes determining whether any migration request is present within the migration queue that falls within the size of the LPOS range. In at least some embodiments, determining (414) whether a migration request is within the size includes determining whether any combination of migration requests fall within the size of the LPOS range. The migration requests may be considered in a priority order; in some embodiments, earlier requests may be given higher priority, while in other cases, priority may be indicated at the time of the request (for example, low, medium, or high). If it is determined that a migration request is within the size of the LPOS range (414, yes branch), the method continues by locating (416) to the EOD and appending data. If it is determined that a migration request is not within the size of the LPOS range (414, no branch), the method continues by locating (418) to the beginning of the recall data.

Locating (416) to the EOD and appending the data may include repositioning the tape head to the end of the data and writing the data corresponding to the migration request. The data may be appended at the end of existing data on the tape. Locating (418) to the BOR and reading the data may include repositioning the tape head to the beginning of the recall data and subsequently reading the recall data.

One embodiment of a migration management method may include obtaining positional information corresponding to end of data (EOD) on a tape in a tape drive within a storage system and a data extent stored in the tape in the tape drive, wherein the positional information includes longitudinal position (LPOS), latitudinal position (wrap), and number of data blocks; comparing a block number of a currently read or located data with the positional information of the data extent to identify a current position of a tape head; identifying a positional relationship between a location of data to be read, the positional information of the EOD on the tape, and the current position of the tape head; identifying a directional relationship between a current direction of the tape head locating to data to be read and a pending write direction; calculating an appendable range for data after the EOD on the tape; and rearranging sequences of write processes within a queue to write data whose size falls within the appendable range to the tape first.

Figure 5A:
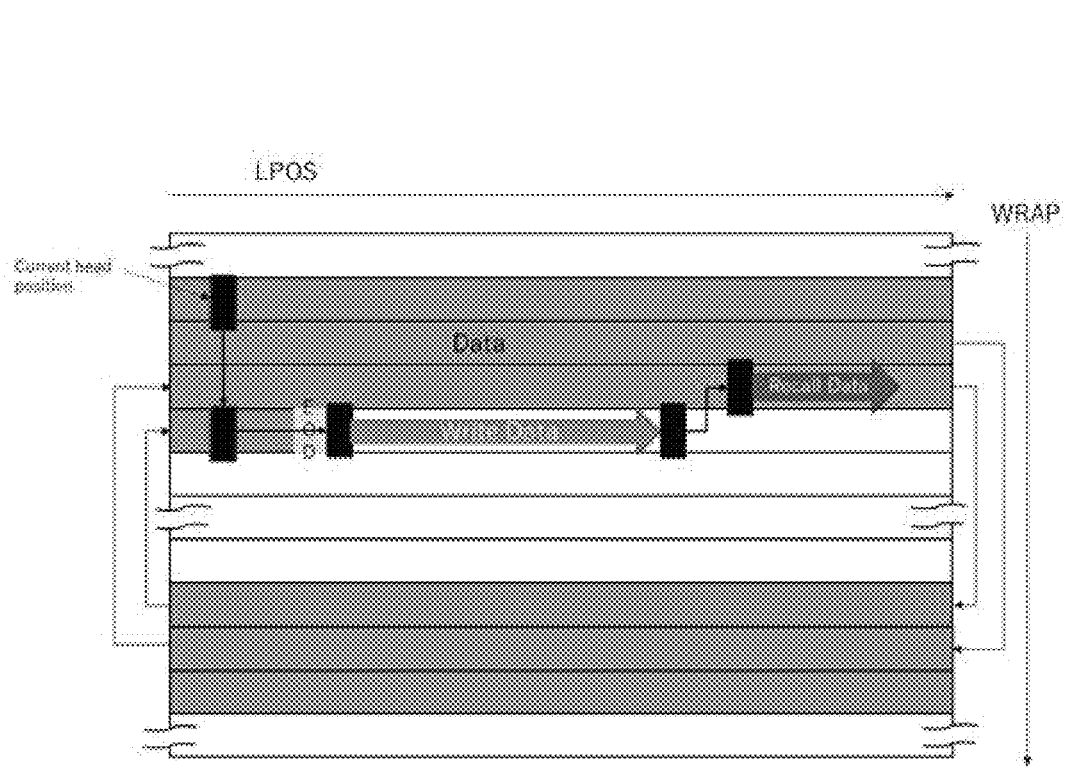
FIG. 5A depicts one embodiment of a tape media wherein the end of data is located between a current head position and the beginning of the recall data, and wherein data is appended while the beginning of the recall data is being located.
Figure 5B:
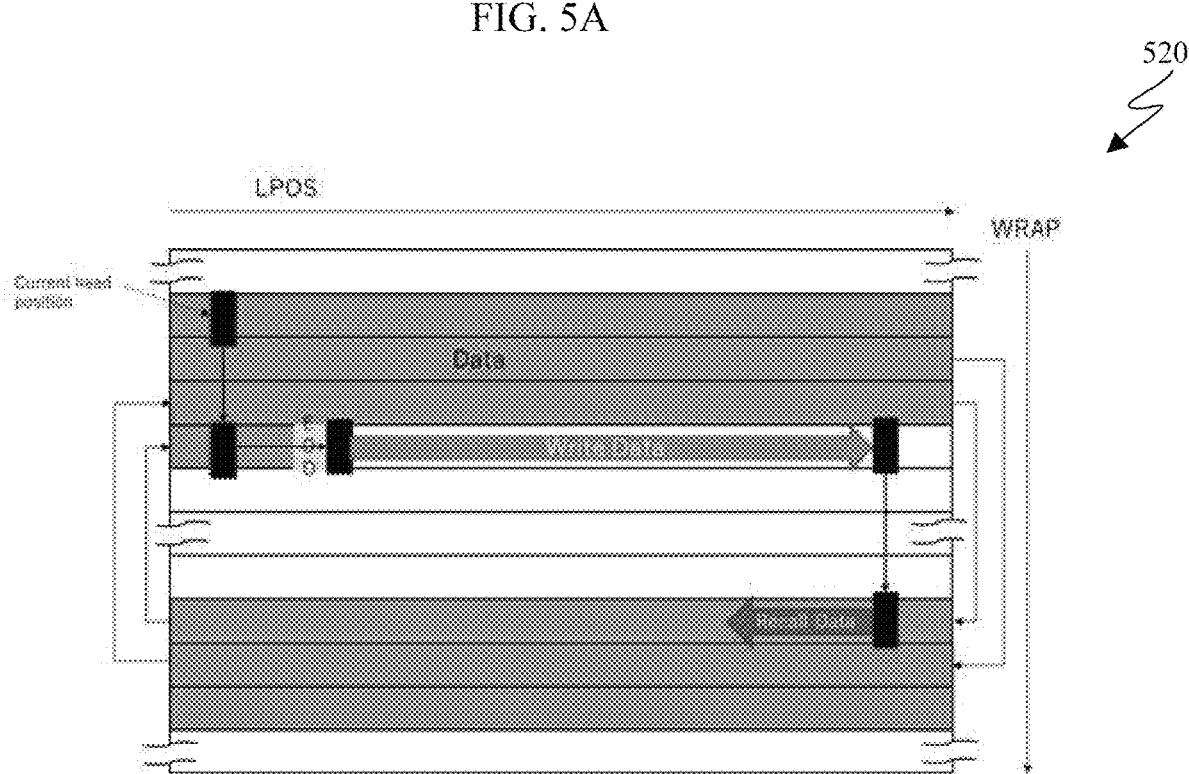
FIG. 5B depicts one embodiment of a tape media wherein the locate direction is opposite the direction of a read instruction.

FIG. 5A depicts one embodiment of a tape media 510 wherein the end of data is located between a current tape head position and the beginning of the recall data, and wherein data is appended while the beginning of the recall data is being located. When EOD is located between a current tape head position and BOR, and a direction to move from the current tape head position to the BOR in a longitudinal direction of the tape (from left to right with respect to FIG. 5A) is the same as a direction to write data in a wrap containing the EOD, the data is appended after EOD while locating BOR. Data can also be migrated before recalling data when the EOD is located between a current tape head position and the BOR, and when the write direction is opposite to a read direction in a wrap containing the BOR as depicted with respect to FIG. 5B. FIG. 5B depicts one embodiment of a tape media 520 wherein the locate direction is opposite the direction of a read instruction.

Figure 5C:
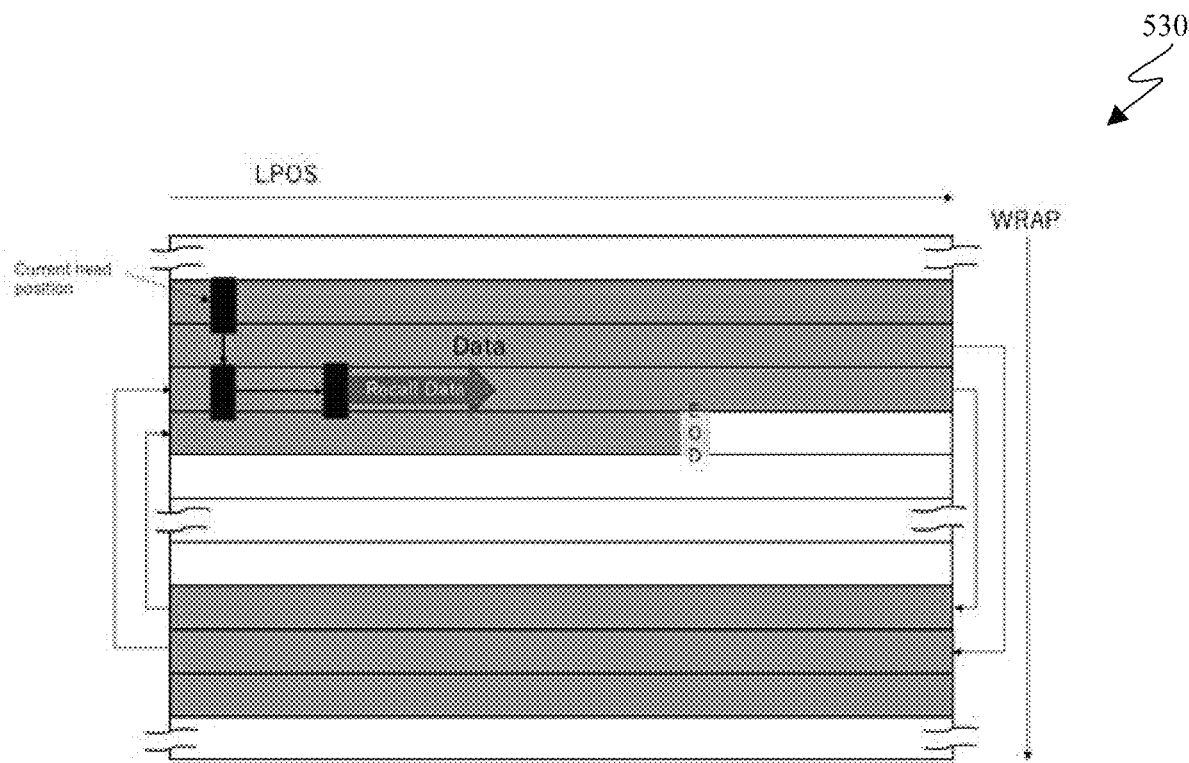
FIG. 5C depicts one embodiment of a tape media wherein the end of data is not located between the current head position and the beginning of the recall data.

FIG. 5C depicts one embodiment of a tape media 530 wherein the end of data (EOD) is not located between the current tape head position and the beginning of the recall data. When the EOD is not located between the current tape head position and the BOR as depicted, the appendable LPOS range is 0, and the host only processes a recall accordingly.

Figure 5D:
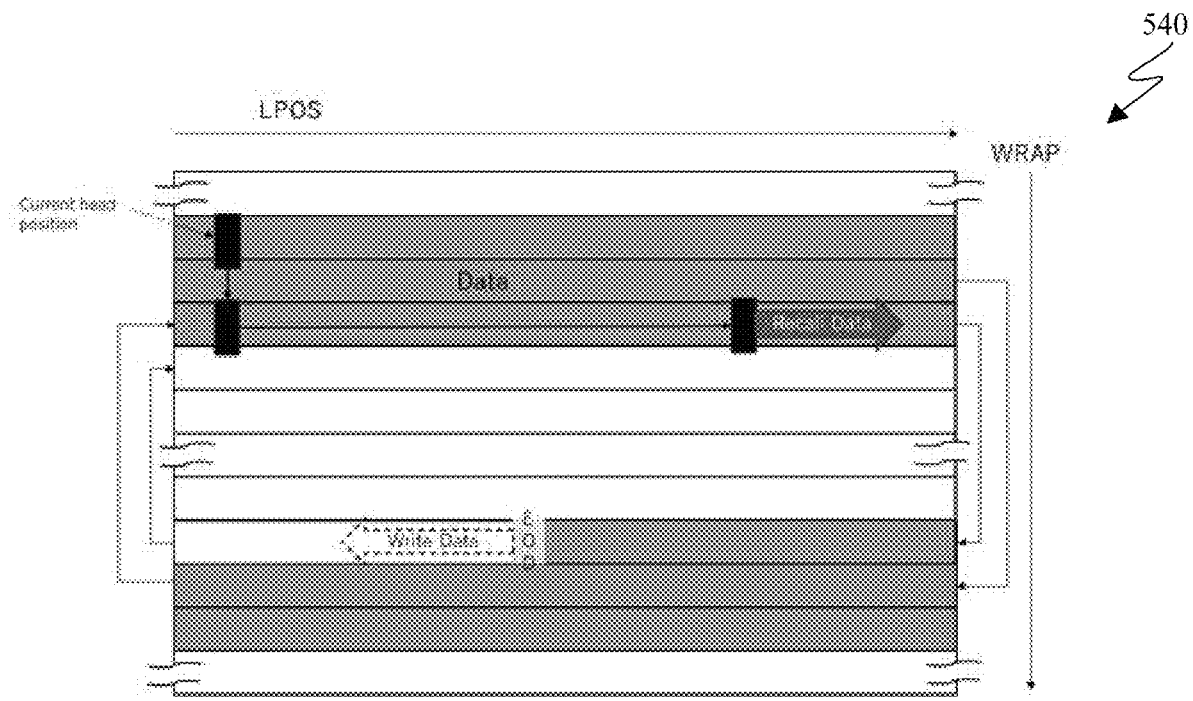
FIG. 5D depicts one embodiment of a tape media wherein the direction to locate is opposite a direction to append, and wherein the directions to read and locate are orthodromic.
Figure 5E:
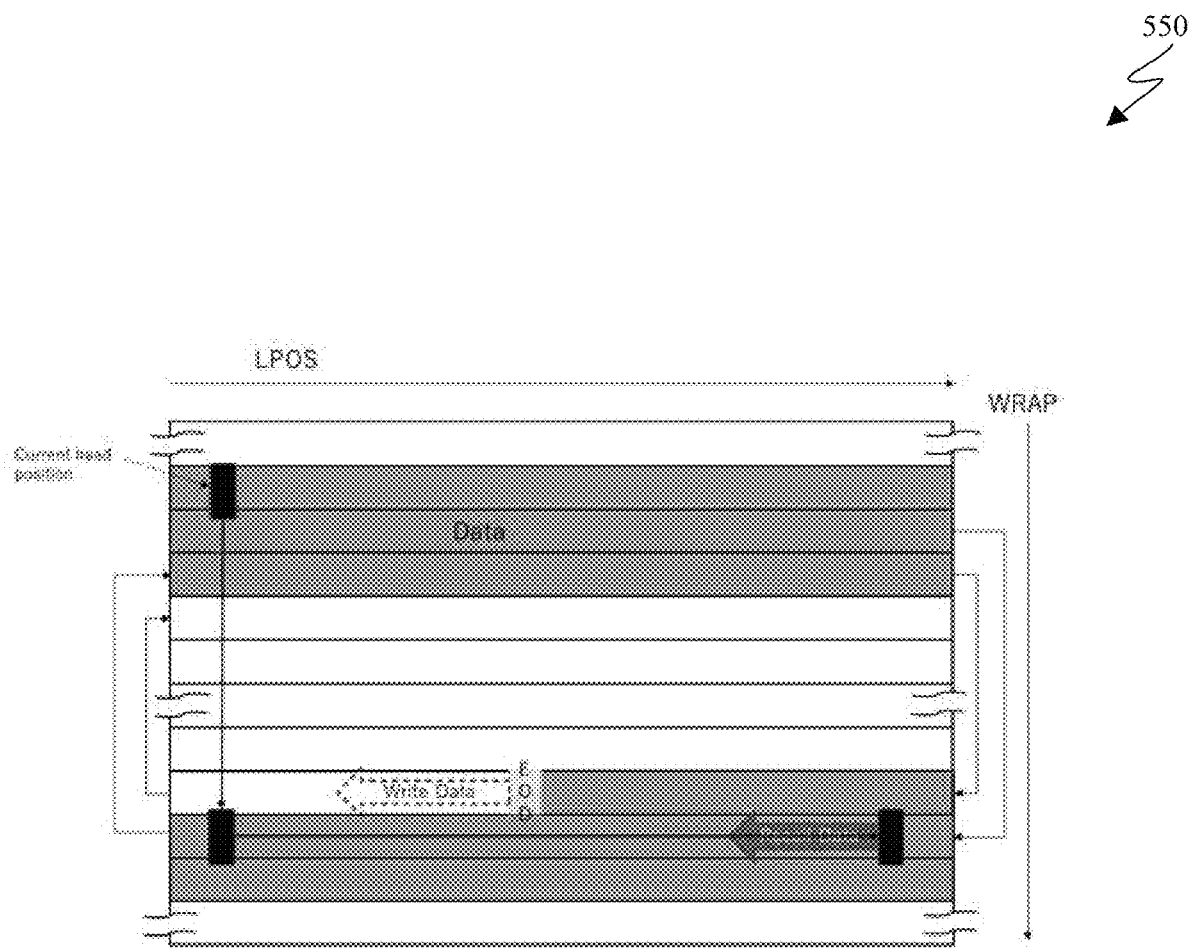
FIG. 5E depicts one embodiment of a tape media wherein the direction to locate is opposite the direction to append, and wherein the directions to read and append are consistent.

FIG. 5D depicts one embodiment of a tape media 540 wherein the direction to locate is opposite a direction to append, and wherein the directions to read and locate are orthodromic. FIG. 5E depicts one embodiment of a tape media 550 wherein the direction to locate is opposite the direction to append, and wherein the directions to read and append are consistent. When the EOD is located between a current tape head position and the BOR, but a direction to move from the current tape head position to the BOR is opposite to a direction to write data in a wrap containing the EOD as depicted with respect to both FIG. 5D and FIG. 5E, the recall is processed while the tape head is passing through EOD and the appendable LPOS range is determined as 0.

Figure 6:
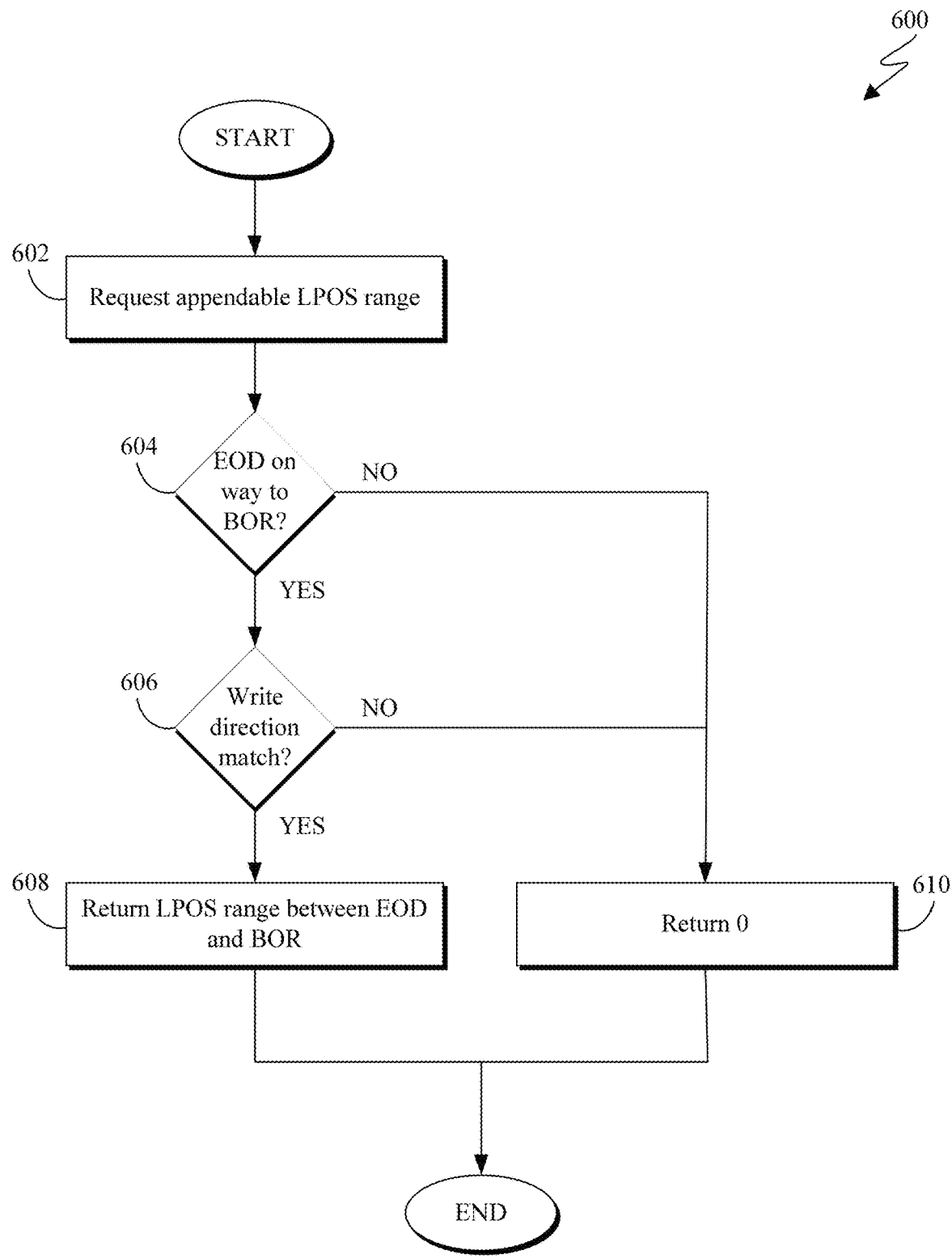
FIG. 6 is a flowchart which depicts one embodiment of an appendable LPOS range determination method in accordance with one embodiment of the present invention.

FIG. 6 depicts one embodiment of an appendable LPOS range determination method 600 in accordance with an embodiment of the present invention. As depicted, appendable LPOS range determination method 600 includes requesting (602) appendable LPOS range details, determining (604) whether the EOD is on the way from a current tape head position to the beginning of the recall data, determining (606) whether the write direction on the EOD wrap is the same as the direction required to locate to the BOR from the current head position, returning (608) an LPOS range between the EOD and the BOR, and returning (610) 0.

Requesting (602) appendable LPOS range includes issuing a request to determine the LPOS range beginning with the first recorded block of recall data. The appendable LPOS range corresponds to a range on the tape to which data can be appended, as indicated by the distance measured between occupied longitudinal positions.

Determining (604) whether the EOD is on the way from a current tape head position to the beginning of the recall data may include determining whether continuing in a current direction of the tape head will ultimately intersect the EOD. If it is determined that the EOD is on the way from the current tape head position to the beginning of the recall data (604, yes branch), the method continues by determining (606) whether the write direction on the EOD wrap is the same as the direction required to locate to the BOR from the current tape head position. If it is determined that the EOD is not on the way from the current tape head position to the beginning of the recall data (604, no branch), the method continues by returning (610) 0.

Determining (606) whether the write direction on the EOD wrap is the same as the direction required to locate to the BOR from the current tape head position may include determining whether the direction of the write on the EOD wrap matches the direction of the locate function locating to the BOR. If it is determined that the write direction on the EOD wrap is the same as the direction required to locate to the BOR (606, yes branch), the method continues by returning the LPOS range between the EOD and the BOR (608). If it is determined that the write direction on the EOD wrap is not the same as the direction required to locate to the BOR (606, no branch), the method continues by returning (610) 0.

Returning (608) an LPOS range between the EOD and the BOR includes calculating a longitudinal distance between the EOD and the BOR as the appendable LPOS range available to be appended. Similarly, returning (610) 0 includes returning "0" as an LPOS range includes indicating that there is no available appendable range between the EOD and the BOR relative to migration requests within the queue.

Migration can be processed during recall process with a minimum effect on the recall process without keeping migration waiting until completion of processing all recall requests accumulated in a recall queue, thereby improving performance for both recall and migration. Optimal rearrangement of read and write commands by a host is possible without inquiring with a drive in each recall.

Figure 7:
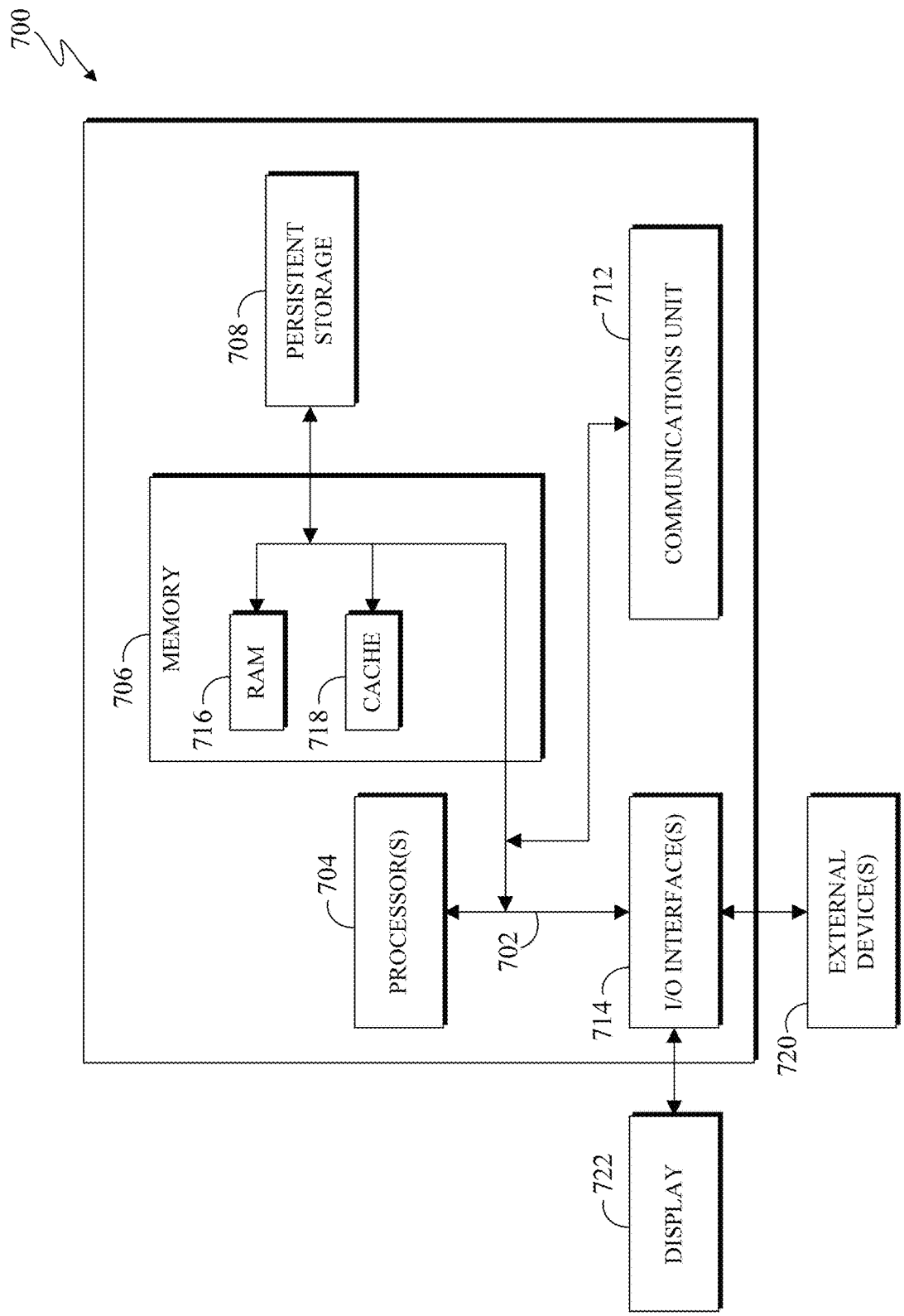
FIG. 7 is a block diagram of components of a computing system in accordance with an embodiment of the present invention.

FIG. 7 depicts a block diagram of components of a computing system in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

As depicted, the computer 700 includes communications fabric 702, which provides communications between computer processor(s) 704, memory 706, persistent storage 708, communications unit 712, and input/output (I/O) interface(s) 714. Communications fabric 702 can be implemented with any architecture designed for passing data and/or control information between processors (such as microprocessors, communications, and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 716 and cache memory 718. In general, memory 706 can include any suitable volatile or non-volatile computer-readable storage media.

One or more programs may be stored in persistent storage 708 for access and/or execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links.

I/O interface(s) 714 allows for input and output of data with other devices that may be connected to computer 700. For example, I/O interface 714 may provide a connection to external devices 720 such as a keyboard, keypad, a touch screen, and/or some other suitable input device. External devices 720 can also include portable computer-readable storage media such as, for example, thumb drives, portable optical or magnetic disks and tape, and memory cards. Software and data used to practice embodiments of the present invention can be stored on such portable computer-readable storage media and can be loaded onto persistent storage 708 via I/O interface(s) 714. I/O interface(s) 714 also connect to a display 722.

Display 722 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:
obtaining positional information corresponding to end of data (EOD) on a tape and a data extent stored in the tape, wherein the positional information includes longitudinal position (LPOS), latitudinal position (wrap), and number of data blocks;
comparing a block number of at least one of a currently read or located data with the positional information of the data extent to identify a current position of a tape head;
identifying a positional relationship between a location of data to be read, the positional information of the EOD on the tape, and the current position of the tape head;
identifying a directional relationship between a current direction of the tape head locating to data to be read and a pending write direction; and
determining an appendable range for data after the EOD on the tape based, at least in part, on the identified positional relationship and the identified directional relationship.

2. The computer implemented method of claim 1, further comprising rearranging sequences of write requests within a queue to fulfill write requests whose size falls within the appendable range on the tape in priority to write requests whose size falls outside the appendable range on the tape.

3. The computer implemented method of claim 1, wherein data is read from the tape by performing a recall process, and wherein the data is appended to the tape according to a migration process.

4. The computer implemented method of claim 1, further comprising providing a migration management component to a storage system, wherein the migration management component is configured to manage a queue of write processes.

5. The computer implemented method of claim 1, wherein the tape is a component of a hierarchical storage management (HSM) system.

6. The computer implemented method of claim 1, further comprising analyzing a queue of write requests to identify one or more combinations of write requests whose combined size falls within the appendable range on the tape.

7. The computer implemented method of claim 6, further comprising maximizing a number of write requests which can be fulfilled within the appendable range on the tape.

8. A computer program product comprising:
one or more computer readable storage media and program instructions stored on the one or more computer readable storage media, the program instructions comprising instructions to:
obtain positional information corresponding to end of data (EOD) on a tape and a data extent stored in the tape, wherein the positional information includes longitudinal position (LPOS), latitudinal position (wrap), and number of data blocks;
compare a block number of at least one of a currently read or located data with the positional information of the data extent to identify a current position of a tape head;
identify a positional relationship between a location of data to be read, the positional information of the EOD on the tape, and the current position of the tape head;
identify a directional relationship between a current direction of the tape head locating to data to be read and a pending write direction; and
determine an appendable range for data after the EOD on the tape based, at least in part, on the identified positional relationship and the identified directional relationship.

9. The computer program product of claim 8, the program instructions further comprising instructions to rearrange sequences of write requests within a queue to fulfill write requests whose size falls within the appendable range on the tape in priority to write requests whose size falls outside the appendable range on the tape.

10. The computer program product of claim 8, wherein data is read from the tape by performing a recall process and wherein the data is appended to the tape according to a migration process.

11. The computer program product of claim 9, the program instructions further comprising instructions to provide a migration management component to a storage system, wherein the migration management component is configured to manage the queue of write processes.

12. The computer program product of claim 8, wherein the tape is a component of a hierarchical storage management (HSM) system.

13. The computer program product of claim 8, the program instructions further comprising instructions to analyze a queue of write requests to identify one or more combinations of write requests whose combined size falls within the appendable range on the tape.

14. The computer program product of claim 13, the program instructions further comprising instructions to maximize a number of write requests which can be fulfilled within the appendable range on the tape.

15. A computer system comprising:
one or more computer processors;
one or more computer-readable storage media; and
program instructions stored on the computer-readable storage media for execution by at least one of the one or more processors, the program instructions comprising instructions to:
obtain positional information corresponding to end of data (EOD) on a tape and a data extent stored in the tape, wherein the positional information includes longitudinal position (LPOS), latitudinal position (wrap), and number of data blocks;
compare a block number of at least one of a currently read or located data with the positional information of the data extent to identify a current position of a tape head;
identify a positional relationship between a location of data to be read, the positional information of the EOD on the tape, and the current position of the tape head;
identify a directional relationship between a current direction of the tape head locating to data to be read and a pending write direction; and
determine an appendable range for data after the EOD on the tape based, at least in part, on the identified positional relationship and the identified directional relationship.

16. The computer system of claim 15, the program instructions further comprising instructions to rearrange sequences of write requests within a queue to fulfill write requests whose size falls within the appendable range on the tape in priority to write requests whose size falls outside the appendable range on the tape.

17. The computer system of claim 15, wherein the tape is a component of a hierarchical storage management (HSM) system.

18. The computer system of claim 16, the program instructions further comprising instructions to provide a migration management component to a storage system, wherein the migration management component is configured to manage the queue of write processes.

19. The computer system of claim 15, the program instructions further comprising instructions to analyze a queue of write requests to identify one or more combinations of write requests whose combined size falls within the appendable range on the tape.

20. The computer system of claim 19, the program instructions further comprising instructions to maximize a number of write requests which can be fulfilled within the appendable range on the tape.

\* \* \* \* \*